United States Patent
Ge et al.

(10) Patent No.: US 7,245,384 B2
(45) Date of Patent: Jul. 17, 2007

(54) SAMPLE INCLINATION MEASURING METHOD

(75) Inventors: Zongtao Ge, Saitama (JP); Fumio Kobayashi, Saitama (JP); Kunihiko Tanaka, Saitama (JP)

(73) Assignee: Fujinon Corporation, Saitama (JP)

( * ) Notice: Subject to any disclaimer, the term of this patent is extended or adjusted under 35 U.S.C. 154(b) by 452 days.

(21) Appl. No.: 10/465,623

(22) Filed: Jun. 20, 2003

(65) Prior Publication Data
US 2004/0001205 A1   Jan. 1, 2004

(30) Foreign Application Priority Data
Jul. 1, 2002   (JP) ............................. 2002-192764

(51) Int. Cl.
*G01B 9/02* (2006.01)

(52) U.S. Cl. ...................................... 356/510; 356/512

(58) Field of Classification Search ................ 356/496, 356/505, 508, 510
See application file for complete search history.

(56) References Cited

U.S. PATENT DOCUMENTS

| 4,717,250 | A | * | 1/1988 | Sommargren | ............... 356/485 |
| 4,832,489 | A | * | 5/1989 | Wyant et al. | ............... 356/513 |
| 5,200,797 | A | * | 4/1993 | Tank et al. | .................. 356/510 |
| 6,100,980 | A | * | 8/2000 | Ichikawa | .................... 356/511 |
| 6,707,559 | B2 | * | 3/2004 | Ge | ............................ 356/508 |
| 6,947,149 | B2 | * | 9/2005 | Kobayashi et al. | ......... 356/496 |
| 6,999,181 | B2 | * | 2/2006 | Dulman | ....................... 356/512 |

* cited by examiner

*Primary Examiner*—Hwa (Andrew) Lee
(74) *Attorney, Agent, or Firm*—Snider & Associates; Ronald R. Snider

(57) ABSTRACT

A sample inclination measuring method rotates, by a predetermined angle with respect to an interferometer apparatus, a columnar member having a leading end face in a planar form while the columnar member is held by a clamping apparatus, detects a relative angle between a reference surface of the interferometer apparatus and the leading end face at each of two rotational positions, and measures the inclination of the axis of the columnar member by using a predetermined arithmetic expression according to thus detected two angles.

10 Claims, 9 Drawing Sheets

1ST ROTATIONAL POSITION

2ND ROTATIONAL POSITION

1ST ROTATIONAL POSITION

2ND ROTATIONAL POSITION

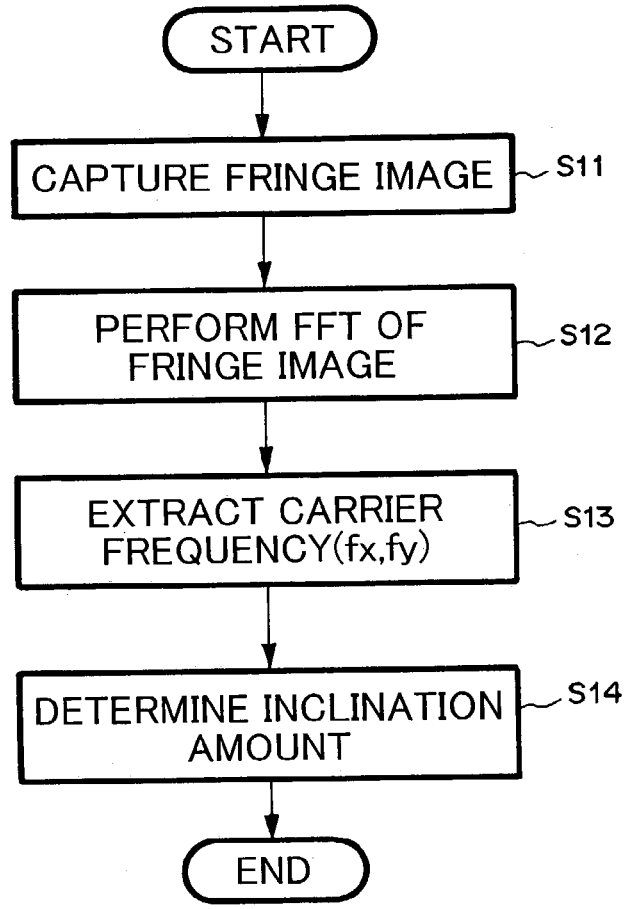
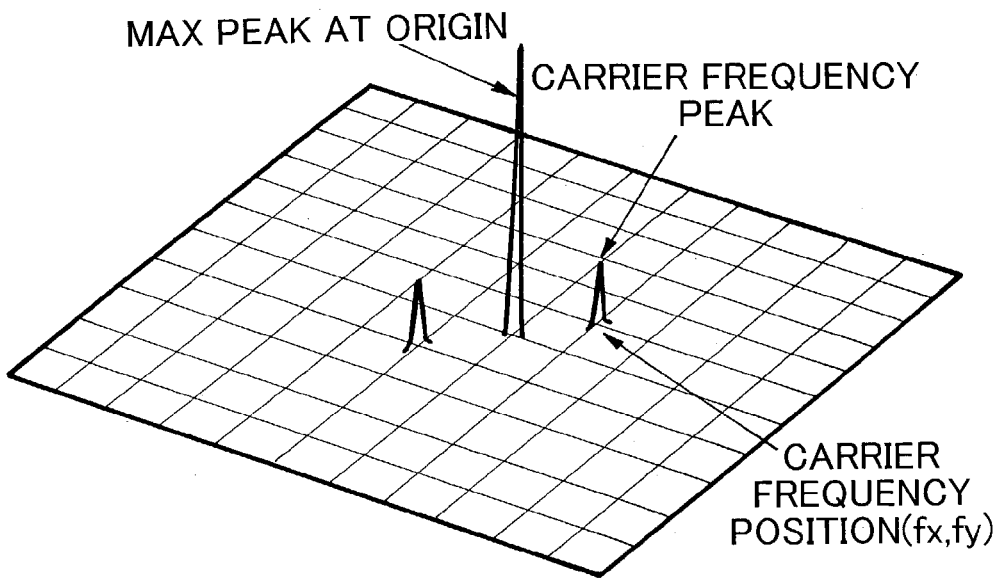

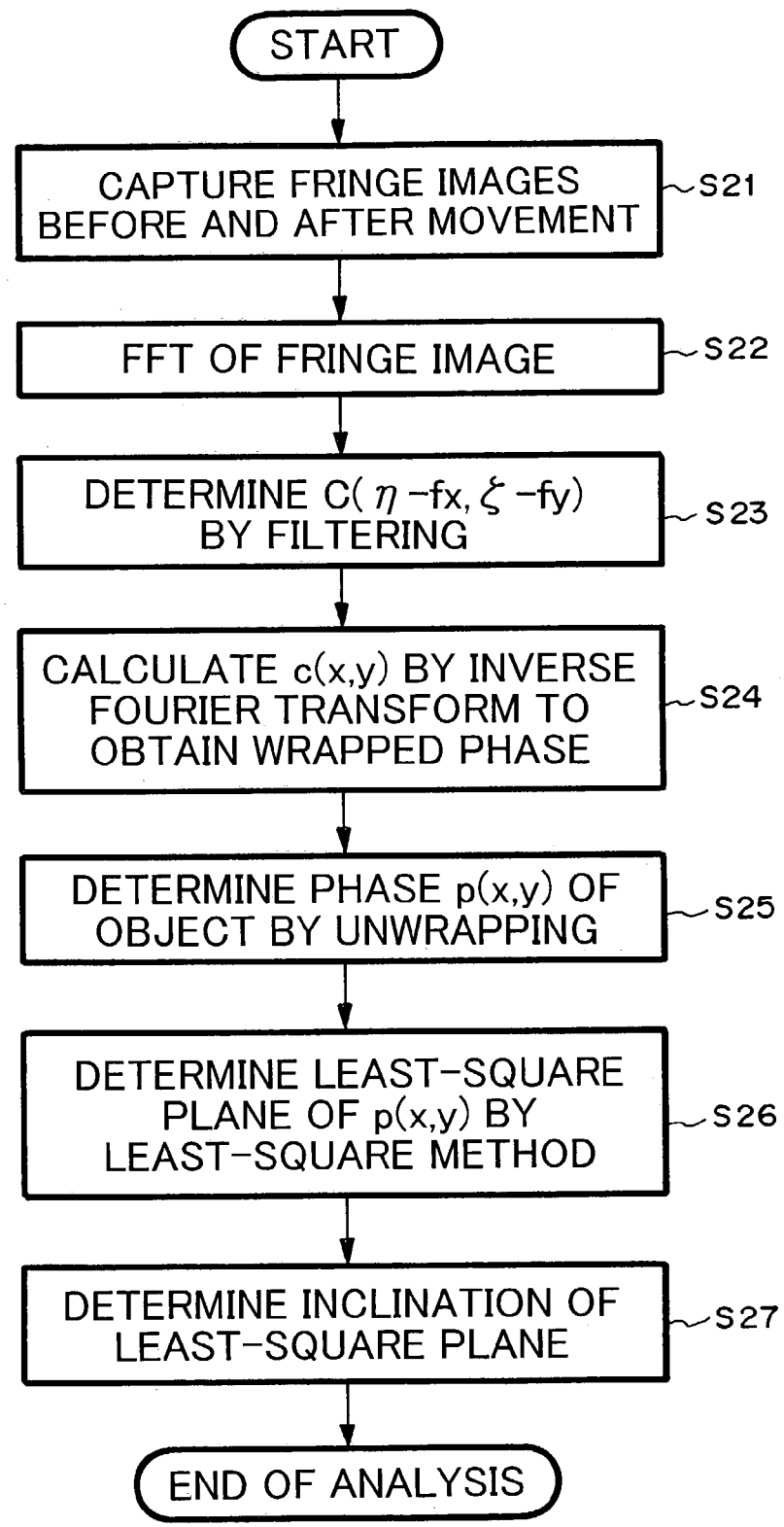

SAMPLE INCLINATION MEASURING METHOD

RELATED APPLICATIONS

This application claims the priority of Japanese Patent Application No. 2002-192764 filed on Jul. 1, 2002, which is incorporated herein by reference.

BACKGROUND OF THE INVENTION

1. Field of the Invention

The present invention relates to a sample inclination measuring method for measuring an inclination of an axis of a columnar member such as a ferrule, for example, which is held by a clamping apparatus when analyzing the form or the like of a leading end part thereof by using a microscopic interferometer apparatus (also known as "interferometric microscope apparatus"), for example.

2. Description of the Prior Art

Research and development of optical fibers used for optical communications has recently been well underway. Known as an example of this kind of optical fibers is one comprising a core having an outer diameter of about 10 μm; and a cladding layer, disposed at the outer periphery of the core, having an outer diameter of about 125 μm; while further comprising a ferrule, disposed at a connecting end part thereof, for connecting the optical fiber to another optical fiber.

The ferrule is a cylindrical component for holding and securing one end of the optical fiber in each of a set of plugs. After an optical fiber is inserted and secured with an adhesive or the like to the center part of the outer diameter of a ferrule, the leading end of the ferrule is polished into a mirror surface, so that two optical fibers held by respective ferrules can be connected to each other when the leading end faces of the two ferrules are butted against each other.

Conventionally known as the leading end face of the ferrule is one polished into a plane orthogonal to the optical axis.

For reducing the optical loss occurring when optical fibers are connected to each other, various high-precision specs on the order of μm have been defined by JIS Japanese Industrial Standard).

Also, there are cases where microscopic interferometer apparatus are used for inspecting whether produced ferrules conform to the specifications or not. A microscopic interferometer apparatus has been configured such that object light carrying phase information such as the surface form and refractive index distribution of a minute sample and reference light reflected from a predetermined reference plate are caused to interfere with each other, thus obtained interference fringes are observed, and forms and changes of the interference fringes are measured and analyzed, so as to attain the phase information of the sample.

When inspecting a produced ferrule by using such a microscopic interferometer apparatus, a clamping apparatus is disposed at a predetermined position in front of the reference plate, so as to hold the ferrule to be inspected.

Since the specification for the leading end face of the ferrule is on the order of μm as mentioned above, its measurement is required to be of a very high accuracy, which makes it difficult to attain a measurement accuracy suitable for the inspection even when the ferrule held by the clamping apparatus tilts only slightly. In some measurement items, a measurement accuracy suitable for the inspection is hard to attain unless the error in inclination between a normal of the reference surface of the microscopic interferometer apparatus and the axis of the ferrule is at an angle of 10 seconds or less.

Though the inclination of the clamping apparatus may be adjusted while the inclination of such a ferrule is directly measured, the measurement and adjustment therefor is quite complicated and requires a high accuracy, whereby errors in inclination cannot be adjusted easily.

In a ferrule of a type specified such that the inclination of the leading end face coincides with a perpendicular to the axis of the ferrule, the measurement can be made efficient if the angular error (perpendicularity) of the leading end face with respect to the perpendicular to the axis of the ferrule can be measured together with the inclination of the axis of the ferrule (concentricity).

For measuring the perpendicularity, a technique using an encoder to identify a predetermined angle (90°), and a technique directly determining the angle by using a level have also been tried. However, using such techniques is difficult to achieve highly accurate measurement results.

SUMMARY OF THE INVENTION

In view of such circumstances, it is a first object of the present invention to provide a sample inclination measuring method which makes it possible to measure at a low cost with a high accuracy and in an easy manner the inclination of the axis of a ferrule held by a clamping apparatus.

It is a second object of the present invention to provide a sample inclination measuring method which makes it possible to adjust at a low cost with a high accuracy in an easy manner the inclination of the axis of a ferrule held by a clamping apparatus and the inclination of the leading end face of the ferrule with respect to the perpendicular to the axis of the ferrule at the same time.

For achieving the first object, the present invention provides a first sample inclination measuring method for measuring an inclination of an axis of a columnar member having a leading end face in a planar form while said columnar member is held by a clamping apparatus and said leading end face as a sample is observed by an angle measuring apparatus;

the method comprising the steps of:

rotating the columnar member by a predetermined angle with respect to the angle measuring apparatus while in a state held by the clamping apparatus, and detecting angles at each of two rotational positions; and measuring the inclination of the axis of the columnar member by using a predetermined arithmetic expression according to the detected two angles.

The angle measuring apparatus may be an autocollimator.

Further, the present invention provides another sample inclination measuring method for measuring an inclination of an axis of a columnar member having a leading end face in a planar form while the columnar member is held by a clamping apparatus and the leading end face as a sample is observed by an interferometer apparatus;

the method comprising the steps of:

rotating the columnar member by a predetermined angle with respect to the interferometer apparatus while in a state held by the clamping apparatus, and detecting a relative angle between a reference surface of the interferometer apparatus and the leading end face at each of two rotational positions; and measuring the inclination of the axis of the columnar member by using a predetermined arithmetic expression according to thus detected two angles.

Preferably, in this case, the relative angle between the reference surface of the interferometer apparatus and the leading end face is detected at each of first and second rotational angles separated from each other by the predetermined angle of 180°; and the inclination of the axis of the columnar member is measured by using the following set of conditional expressions (1):

$$\begin{cases} \beta_x = \dfrac{m_{x1} + m_{x2} - 180}{2} \\ \beta_y = \dfrac{m_{y1} + m_{y2} - 180}{2} \end{cases} \quad (1)$$

where $m_{x1}$ and $m_{y1}$ are x- and y-directional angles detected at the first rotational position, respectively; $m_{x2}$ and $m_{y2}$ are x- and y-directional angles detected at the second rotational position, respectively; and $\beta_x$ and $\beta_y$ are angles of inclinations of the axis of rotation in x and y directions, respectively.

For achieving the second object, the present invention provides a second sample inclination measuring method for measuring an inclination of an axis of a columnar member having a leading end face in a planar form while the columnar member is held by a clamping apparatus and the leading end face as a sample is observed by an interferometer apparatus, and an angle of the leading end face with respect to a perpendicular to the axis of the columnar member;

the method comprising the steps of:

rotating the columnar member by a predetermined angle with respect to the interferometer apparatus while in a state held by the clamping apparatus, and detecting a relative angle between a reference surface of the interferometer apparatus and the leading end face at each of two rotational positions; and measuring the inclination of the axis of the columnar member and an inclination of the leading end face with respect to the perpendicular of the axis of the columnar member by using a predetermined arithmetic expression according to thus detected two angles.

Preferably, in this case, the relative angle between the reference surface of the interferometer apparatus and the leading end face is detected at each of first and second rotational angles separated from each other by the predetermined angle of 180°; and the inclination of the axis of the columnar member and the inclination of the leading end face with respect to the perpendicular to the axis of the columnar member are measured by using the following sets of conditional expressions (2) and (3):

$$\begin{cases} \alpha_x = \dfrac{180 - m_{x1} + m_{x2}}{2} \\ \alpha_y = \dfrac{180 - m_{y1} + m_{y2}}{2} \end{cases} \quad (2)$$

$$\begin{cases} \beta_x = \dfrac{m_{x1} + m_{x2} - 180}{2} \\ \beta_y = \dfrac{m_{y1} + m_{y2} - 180}{2} \end{cases} \quad (3)$$

where $m_{x1}$ and $m_{y1}$ are x- and y-directional angles detected at the first rotational position, respectively; $m_{x2}$ and $m_{y2}$ are x- and y-directional angles detected at the second rotational position, respectively; $\beta_x$ and $\beta_y$ are angles of inclinations of the axis of rotation in x and y directions, respectively; and $\alpha_x$ and $\alpha_y$ are angles of inclinations of the leading end face with respect to the perpendicular to the axis of the columnar member, respectively.

In each of the above-mentioned methods, the angles can be detected at the two rotational positions by using a phase shift fringe analysis or a Fourier transform fringe analysis.

The methods are particularly useful when the columnar member is a ferrule.

The interferometer apparatus may be a microscopic interferometer apparatus.

BRIEF DESCRIPTION OF THE DRAWINGS

FIG. 3 is a flowchart for explaining a technique for detecting the angle between a ferrule leading end face and a reference surface;

FIG. 4 is a schematic view for explaining a part of the technique shown in FIG. 3;

FIG. 5 is a flowchart showing a modified example of the flowchart shown in FIG. 3;

DESCRIPTION OF THE PREFERRED EMBODIMENTS

The following, embodiments of the present invention will be explained with reference to the drawings. Before explaining sample inclination measuring methods in accordance with embodiments of the present invention, a microscopic interferometer apparatus, mounted with a clamping apparatus for holding a ferrule as a sample, for observing a leading end face of the ferrule by a predetermined interference optical system will be explained with reference to FIG. 11.

Microscopic Interferometer Apparatus

Figure 11:
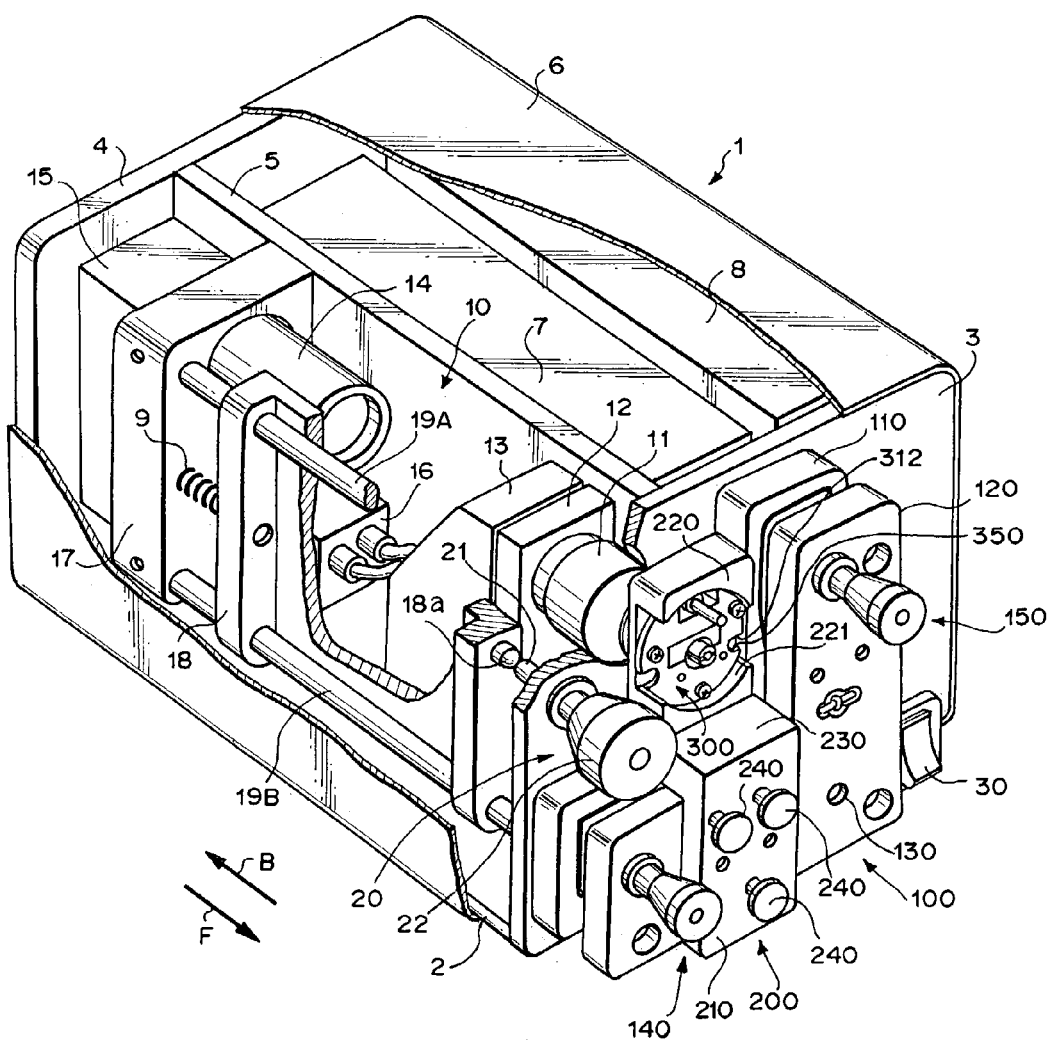
FIG. 11 is a perspective view of a microscopic interferometer apparatus equipped with the clamping apparatus shown in FIG. 7.

FIG. 11 is a perspective view showing the microscopic interferometer apparatus in accordance with an embodiment of the present invention in a partly cutaway fashion.

The microscopic interferometer apparatus 1 shown in FIG. 11 comprises a main housing constituted by a bottom plate 2, a front plate 3 (depicted in a partly cutaway fashion), a rear plate 4, a partition 5, and a cover case 6 (depicted in a partly cutaway fashion), whereas a power supply 7, a control box 8, and a main system 10 are disposed within the main housing.

The main system 10 comprises an objective lens unit 11, a piezoelectric unit 12, a half mirror/light source unit 13, an imaging lens unit 14, a mirror box 15, and a CCD camera unit 16. Among them, the imaging lens unit 14, mirror box 15, and CCD camera unit 16 are attached to a stationary table 17 secured to the partition 5, whereas the objective lens unit 11, piezoelectric unit 12, and half mirror/light source unit 13 are attached to a focus table 18 (depicted in a partly cutaway fashion).

The focus table 18 is supported by upper and lower guide shafts 19A, 19B (depicted in a partly cutaway fashion) extending in parallel in back and forth directions (indicated by arrows B and F in the drawing), so as to be slidable back and forth. A coil spring 9 is disposed between the stationary table 17 and the focus table 18, so that the focus table 18 is urged forward (in the direction of arrow F in the drawing) by the elasticity of the coil spring 9.

The front plate 3 is provided with a focus adjustment screw 20 for moving the focus table 18 so as to carry out focus adjustment of the main system 10. This focus adjustment screw 20 comprises a screw shaft 21 threaded into an undepicted screw hole formed in the front plate 3 so as to be movable back and forth when rotating about its axis, and a knob 22 for rotating the screw shaft 21. The leading end face of the screw shaft 21 abuts against a semispherical protrusion 18a disposed at the front face part of the focus table 18. As the length of screw shaft 21 projected from the front plate 3 is changed by rotating the knob 22, the focus adjustment screw 20 can move the focus table 18 back and forth along the guide axes 19A, 19B, thus enabling focus adjustment.

The interferometer main system 10 having the above-mentioned configuration irradiates a minute sample (not depicted) held at a predetermined position in front of the objective lens unit 11 with illumination light from an undepicted light source separated from reference light, causes the object light reflected from the sample to interfere with the reference light. The interferometer main system 10 passes the thus generated interference light through an imaging lens system (not depicted) within the imaging lens unit 14, and then forms an image of interference fringes onto an undepicted CCD. When forms and changes of thus obtained interference fringes are measured and analyzed, the three-dimensional measurement of the surface form of the sample and the physical property measurement thereof can be carried out. Employable as the interferometer main system 10 are various types such as those of Mireau, Michelson, and Linnik.

The front plate 3 is provided with an inclination adjusting apparatus 100. The inclination adjusting apparatus 100 comprises an L-shaped first base member 110 secured to the front plate 3, and a second base member 120 having an L-shape similar to the first base member 110 and opposing the first base member 110. The second base member 120 is supported so as to be inclinable with respect to the first base member 110 while using a support part 130 acting as a fulcrum, and is adapted to tilt about an axis extending in a substantially horizontal direction from the support part 130 and about an axis extending in a substantially vertical direction from the support part 130 by first and second adjusting parts 140, 150, respectively, so as to adjust the inclination with respect to the first base member 110.

A clamping apparatus holder 200 is attached to the second base member 120 of the inclination adjusting apparatus 100. The clamping apparatus holder 200 comprises a front part 210, a rear part 220, and a connecting part 230 connecting them, whereas the front part 210 is fastened by three attachment screws 240 to the second base member 120. The front part 210 of the clamping apparatus holder 200 is positioned on the front face side of the objective lens unit 11, whereas its center part is formed with a holder depression 211 for holding a clamping apparatus 300 therein. The front plate 3 is further provided with a power switch 30 for turning ON/OFF the power of the microscopic interferometer apparatus 1.

Configuration of Clamping Apparatus

Figure 7:
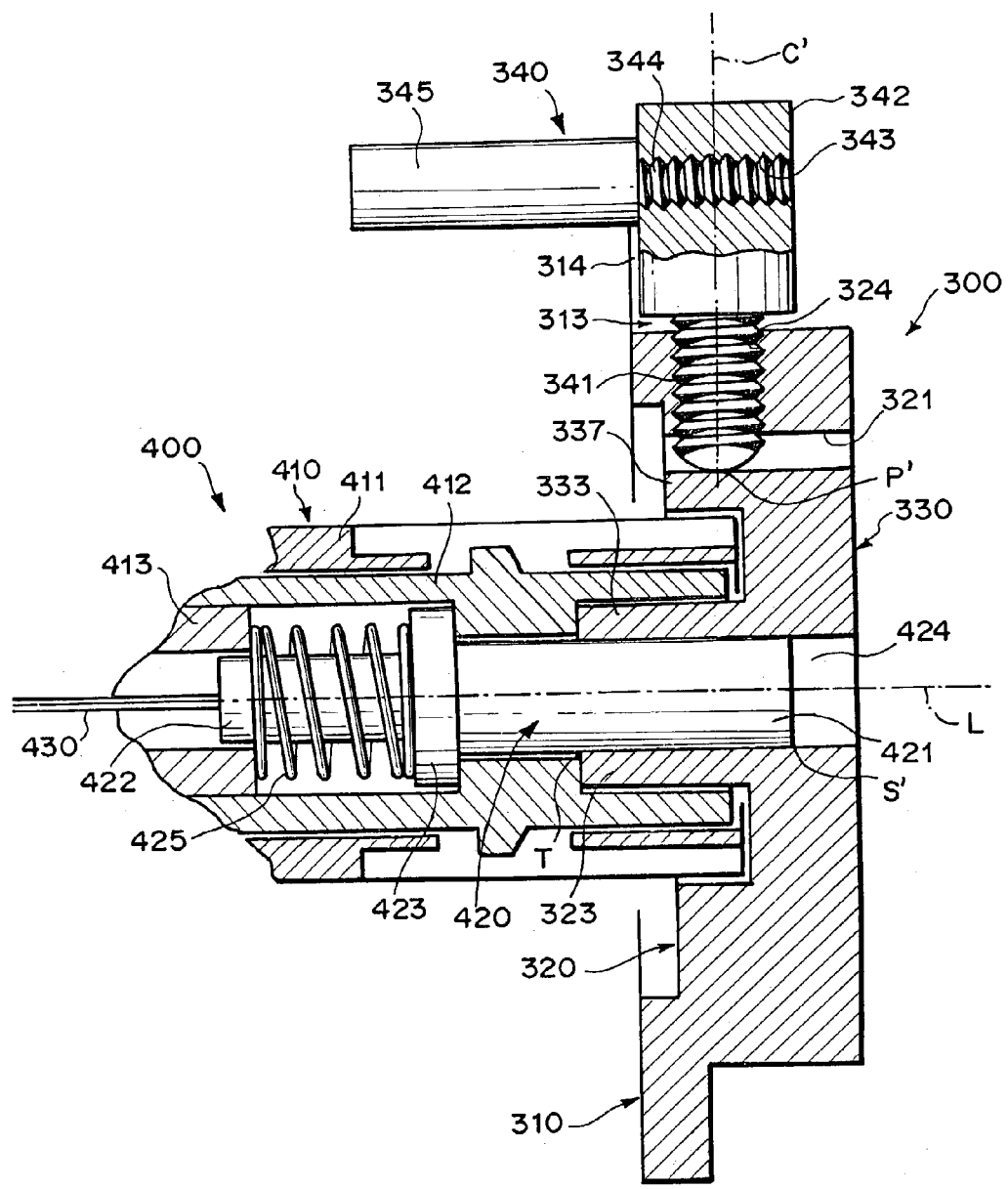
FIG. 7 is a sectional view of a clamping apparatus for a ferrule in accordance with an embodiment of the present invention.
Figure 8:
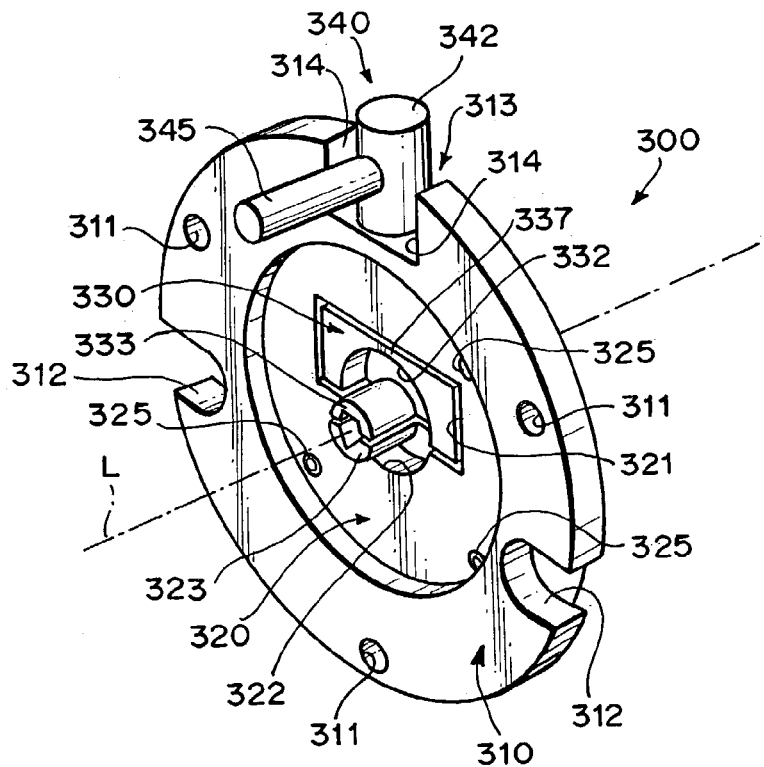
FIG. 8 is a perspective view showing the exterior of the clamping apparatus shown in FIG. 7.
Figure 9:
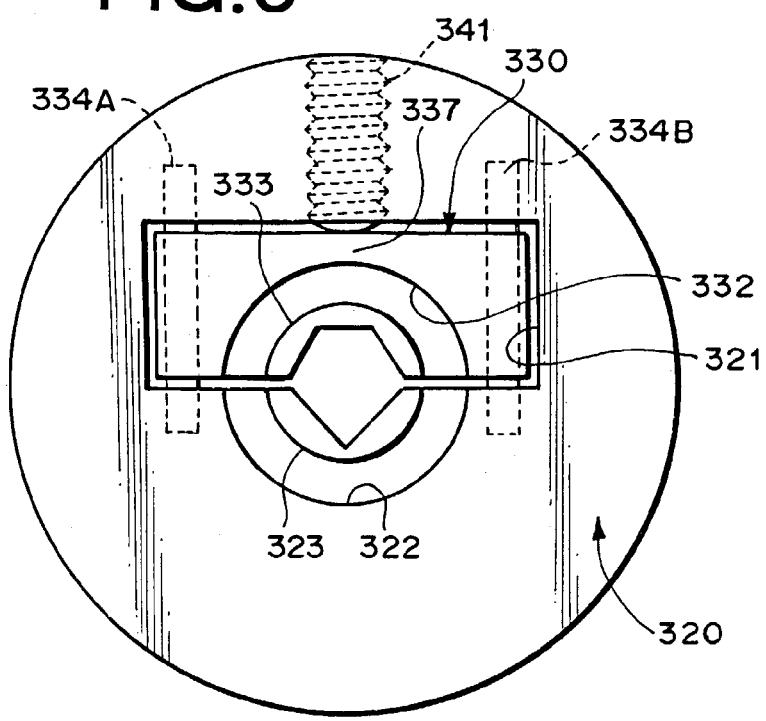
FIG. 9 is a partial front view of the clamping apparatus shown in FIG. 7.
Figure 10:
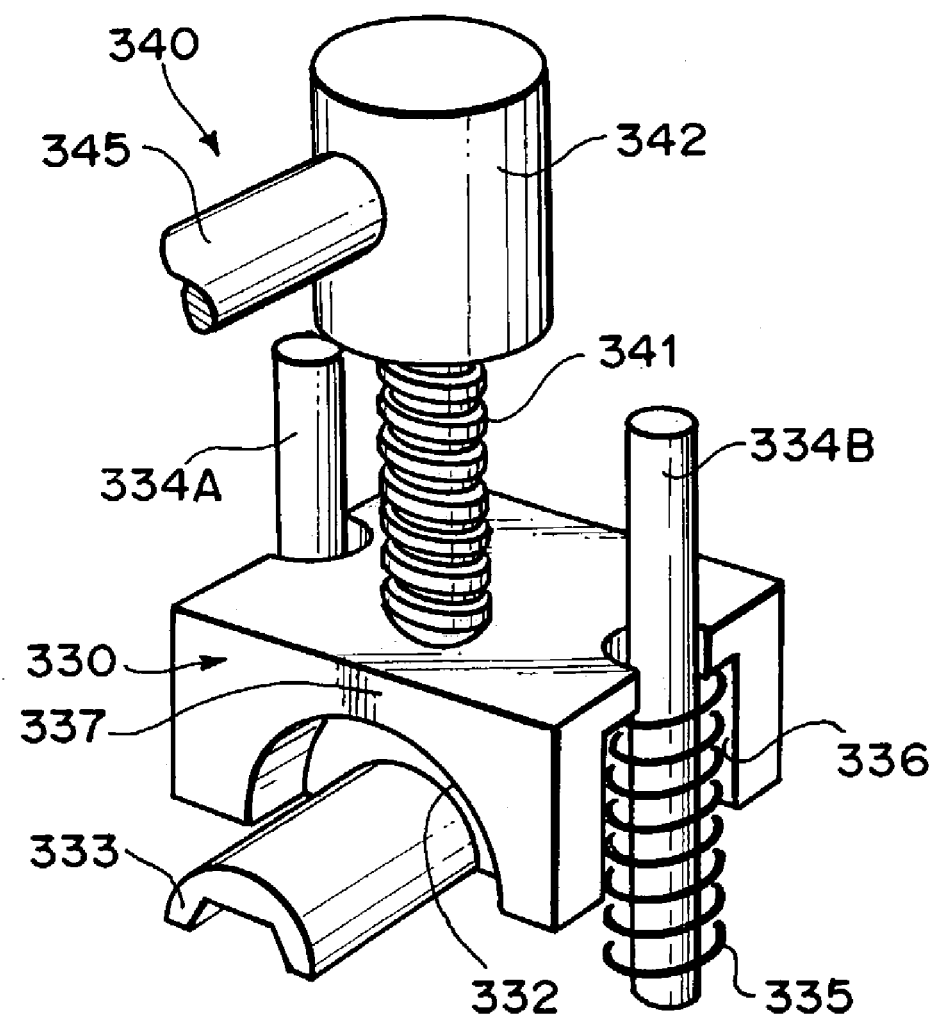
FIG. 10 is a perspective view of a part of the clamping apparatus shown in FIG. 7.

The clamping apparatus 300 will now be explained in detail with reference to FIGS. 7 to 10. The clamping apparatus for carrying out the sample inclination measuring methods of the present invention is not limited to the clamping apparatus explained here, as a matter of course. FIG. 7 is a sectional view of the clamping apparatus for a ferrule in accordance with an embodiment of the present invention, FIG. 8 is a perspective view thereof, FIG. 9 is a partial front view thereof, and FIG. 10 is a perspective view of a part thereof. FIG. 7 shows a state holding the ferrule.

The depicted clamping apparatus 300 is used for holding a ferrule 420 accommodated within a tubular member 410 shown in FIG. 7 at a predetermined position in front of the objective lens unit 11 of the microscopic interferometer apparatus 1 shown in FIG. 11.

The tubular member 410 constitutes an optical connector plug 400 (which may be simply referred to as "plug 400" in the following) connected to another plug, which is not shown, by way of an undepicted sleeve. It comprises an inner tube 412 and an outer tube 411 slidable back and forth with respect to the inner tube 412, and accommodates the ferrule 420 therewithin.

The ferrule 420 holds an end part of a single-mode type optical fiber 430 at the outer diameter center of a ferrule body 421. A holder constituted by a cylindrical part 422 and a rim 423 is attached to a rear end part of the ferrule body 421. The ferrule body 421 is made of zirconia ceramics, whereas its leading end face 424 is polished into a flat surface.

The ferrule 420 is accommodated within the tubular member 410 while in a state where a coil spring 425 is attached to the cylindrical part 422, and is restricted by a spring stopper ring 413 so as not to drop out rearward. The elasticity of the coil spring 425 urges the ferrule 420 forward (rightward in FIG. 7) at a predetermined pressure, thus making it easy for the leading end face 424 to come into close contact with the leading end face of another ferrule which is not depicted.

As shown in FIGS. 7 and 8, the clamping apparatus 300 comprises a base 310 having a substantially annular form, a support 320 formed like a disk thicker than the base 310, a shifter 330 movable up and down with respect to the support 320, and a pressing member 340 for pressing the shifter 330 from thereabove.

As shown in FIG. 8, the base 310 comprises three screw holes 311, and two positioning cutouts 312, separated from each other by 180°, having the same form. The screw holes 311 receive screws for attaching the clamping apparatus 300 to the clamping apparatus holder 200 (see FIG. 11), whereas the cutouts 312 are disposed such that the clamping apparatus 300 can be positioned with respect to the clamping apparatus holder 200 if the clamping apparatus 300 is set such that a positioning pin (350 in FIG. 11) provided with the clamping apparatus holder 200 is inserted into one of the cutouts 312. Therefore, the clamping apparatus 300 can be attached to the clamping apparatus holder 200 at two positions rotated from each other by 180°, whereby the ferrule 420 can easily be positioned at two positions rotated from each other by 180° as will be explained later.

The top part of the base 310 is formed with a depression 313.

The support 320 is integrally formed with the base 310, whereas a rectangular window 321 is disposed at a position slightly shifted upward from the center part thereof. The front face of the support 320 is provided with a semicircular depression 322 adjoining the lower side of the window 321, whereas a first support piece 323 extending forward along the axis L of the clamping apparatus 300 is disposed within the depression 322. As shown in FIG. 8, the outer periphery of the first support piece 323 is formed into a semicylindrical surface, whereas the inner periphery thereof is formed into a groove having a V-shaped cross section. The cross section of the first support piece 323 shown in FIG. 7 is taken along the positions where the first support piece 323 and the ferrule 420 are in contact with each other.

The shifter 330 is formed separately from the base 310, and is disposed within the window 321 of the support 320. The front face of the shifter 330 is formed with a semicircular depression 332 formed symmetrical to the depression 322 of the support 320. Disposed within the depression 332 is a second support piece 333 extending forward in a state opposing the first support piece 323 across the axis L of the clamping apparatus 300. As shown in FIG. 8, the outer periphery of the second support piece 333 is formed into a semicylindrical face, whereas the inner periphery thereof is formed into a groove having a trapezoidal cross section.

More specifically, as shown in FIG. 9, the shifter 330 is movable up and down along guide shafts 334A, 334B vertically extending at left and right end parts within the window 321 of the support 320, respectively. As shown in FIG. 10, coil springs 335 (only one of which on the guide shaft 334B side is shown) for urging the shifter 330 upward are attached to the two guide shafts 334A, 334B, respectively, whereas the shifter 330 is formed with spring receiving depressions 336 for holding the upper end parts of the coil springs 335. When the shifter 330 is not pressed by the pressing member 340, because of the elasticity of the coil springs 335, the second support piece 333 of the shifter 330 is located at the clamp release position separated from one side of the ferrule 420 the other side of which is supported by the first support piece 323 of the support 320. The coil springs 335 may be located at positions different from those of the guide shafts 334A, 334B. Other elastic members such as rubber can also be used as means for urging the shifter 330 upward.

As shown in FIG. 7, the pressing member 340 comprises a screw shaft 341 engaging a screw hole 324 extending from the bottom face of the depression 313 formed at the top part of the base 310 to the window 321 formed in the support 320, a screw base 342 having a diameter greater than that of the screw shaft 341, and a lever member 345 having a screw shaft 344 engaging a screw hole 343 formed in the screw base 342. As the lever member 345 is rotated about the axis C' of the screw shaft 341, the pressing member 340 can press the shifter 330 downward while in a state where the spherical leading end face of the screw shaft 341 is in contact with the shifter 330, thereby displacing the second support piece 333 against the coil springs 335 from the clamp release position to the clamp position in contact with the above-mentioned one side of the ferrule 420.

As shown in FIG. 7, the shifter 330 is provided with a pressure receiving piece 337 extending so as to oppose the second support piece 333 across one side wall part of the tubular member 410 held by the clamping apparatus 300. The pressing member 340 is disposed such that the line of action (coinciding with the above-mentioned axis C') of a force passing its pressing point P' (the intersection between the spherical leading end face of the screw shaft 341 and the pressure receiving piece 337) passes through the tubular member 410 so as to intersect the pressure receiving piece 337 and further pass through the area of ferrule 420 (area between points S' and T in FIG. 7) supported by the first support piece 323. As shown in FIG. 8, the rotating area of the lever member 345 of the pressing member 340 is restricted by a stopper 314 constituted by left and right wall parts of the depression 313 formed at the top part of the base 310 of the clamping apparatus 300.

Operation of Clamping Apparatus

Thus configured clamping apparatus 300 holds the optical connector plug 400 as follows. First, the plug 400 is pressed against the front face of the clamping apparatus 300 such that the leading end part of the ferrule 420 is inserted between the first support piece 323 of the support 320 of the clamping apparatus 300 and the second support piece 333 of the shifter 330. Subsequently, the lever member 345 of the pressing member 340 is rotated, so that the leading end face of the screw shaft 341 of the pressing member 340 presses the pressure receiving piece 337 of the shifter 330, thus displacing the second support piece 333 of the shifter 330 from the clamp release position to the clamp position, whereby the second support piece 333 and the first support piece 323 hold the leading end part of the ferrule 420. Therefore, the plug 400 is held by the clamping apparatus 300 while in a state where the axis (not depicted) of the ferrule 420 coincides with the axis L of the clamping apparatus 300.

In this holding state, the first support piece 323 and second support piece 333 of the clamping apparatus 300 extend from the outside to inside of the leading end of the tubular member 410 while opposing each other. Therefore, the first and second support pieces 323, 333 can attain a longer chuck margin for the ferrule 420. Also, the spherical leading end face of the screw shaft 341 of the pressing member 340 presses the pressure receiving piece 337 of shifter 330 extending so as to overhang the second support piece 333. As a consequence, the line of action of the force of the pressing member 340 passes through the tubular member 410 so as to intersect the pressure receiving piece 337, and further passes through the area of ferrule 420 supported by the first support piece 323. Hence, even when the shifter 330 is pressed by the pressing member 340, the shifter 330 is kept from twisting (which rotates the shifter 330 clockwise in FIG. 7 when the line of action of the force passes outside of the area of ferrule 420 supported by the first support piece 323), whereby the ferrule 420 can be held reliably.

When taking out the plug 400 from the clamping apparatus 300, the lever member 345 of the pressing member 340 is rotated in the opposite direction, so as to stop the leading end face of the screw shaft 341 from pressing the shifter 330, thereby moving the second support piece 333 of the shifter 330 to the clamp release position, so that the first support piece 323 and second support piece 333 stop holding the ferrule 420, thus releasing the ferrule 420.

Sample Inclination Measurement

Though the ferrule 420 is to be reliably held by the clamping apparatus 300, the form spec for the ferrule leading end face 424 is in the order of $\mu$m as mentioned above, whose measurement requires a high accuracy. Therefore, even if the ferrule 420 held by the clamping apparatus tilts by a minute angle with respect to the microscopic interferometer apparatus 1, a measurement accuracy suitable for the inspection is hard to attain.

Such an apparatus comprises various mechanical parts (inclination adjusting apparatus 100, clamping apparatus holder 200, and the like) as mentioned above, whose mechanical errors are likely to accumulate, thereby inclining the ferrule by a minute angle.

This inclination error must be adjusted. Since the accuracy of adjustment is required to be very high, the inclination of the axis of the ferrule with respect to the optical axis of the microscopic interferometer apparatus 1 (assumed to be perpendicular to the reference surface of the microscopic interferometer apparatus 1) is measured by the following technique in the method in accordance with this embodiment.

Figure 1A:
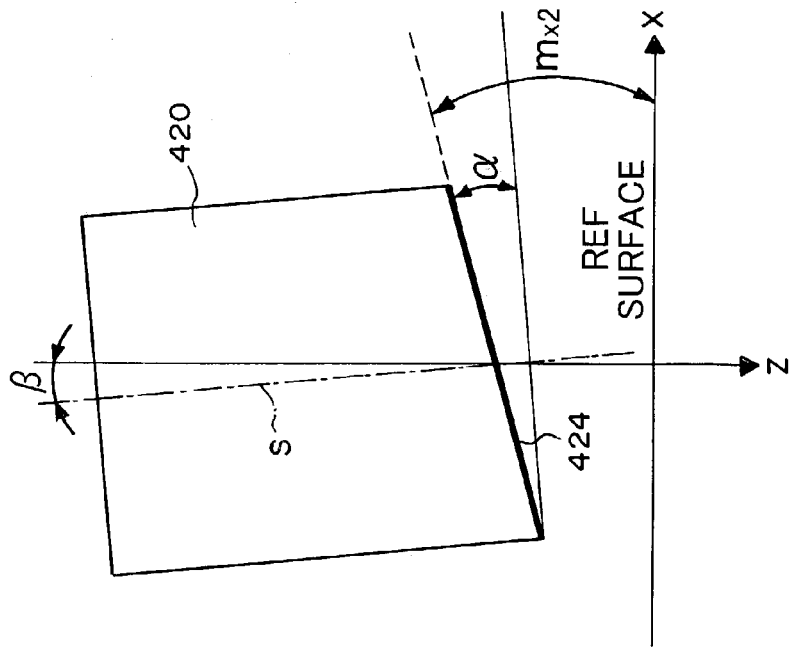
FIGS. 1A and 1B are schematic views for explaining an outline of a (one-dimensional) sample inclination measuring method.
Figure 1B:
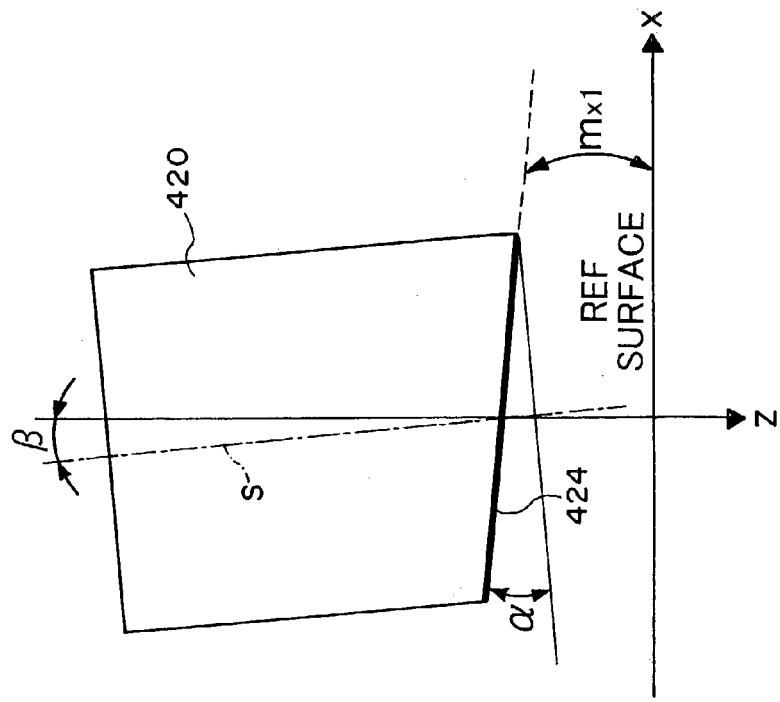

FIGS. 1A and 1B are schematic views showing the sample inclination measuring method in accordance with an embodiment of the present invention.

Here, for convenience, one-directional inclination (x-directional inclination) will be explained.

In a state where the ferrule 420 is held by the clamping apparatus 300, relative angles ($m_{x1}$ and $m_{x2}$) between the leading end face 424 of the ferrule 420 and the reference surface of the microscopic interferometer apparatus 1 are measured at a first rotational position (FIG. 1A) of the ferrule 420 and a second rotational position (FIG. 1B) rotated from the first rotational position by 180°, respectively.

Here, assuming that the leading end face 424 of the ferrule 420 is inclined by an angle $\alpha$ with respect to a perpendicular to the axis S of the ferrule 420, and by an angle $\beta$ with respect to the optical axis of the microscopic interferometer apparatus 1 (a perpendicular to the reference surface of the microscopic interferometer apparatus 1, i.e., Z axis), the angle $\beta$ can be determined by using so-called method of inversion as follows:

First, since $$m_{x1} = \alpha + \beta, \text{ and} \quad (4)$$

$$m_{x2} = 180 - \alpha + \beta, \quad (5)$$

$$\beta = (m_{x1} + m_{x2} - 180)/2. \quad (6)$$

In the ferrule of type specified such that the inclination of the leading end face 424 coincides with the perpendicular to the axis S of the ferrule 420, the efficiency of measurement can be improved if the inclination of the axis S of the ferrule 420 (concentricity) and the angular error (angle $\alpha$) of the leading end face with respect to the perpendicular to the axis S of the ferrule 420 (perpendicularity) can be measured at the same time.

In such a case, the angle $\alpha$ can be determined together with the angle $\beta$ by yielding the following expression (7):

$$\alpha = (m_{x1} - m_{x2} + 180)/2 \quad (7)$$

together with the above-mentioned expression (6) from the above-mentioned expressions (4) and (5).

Figure 2A:
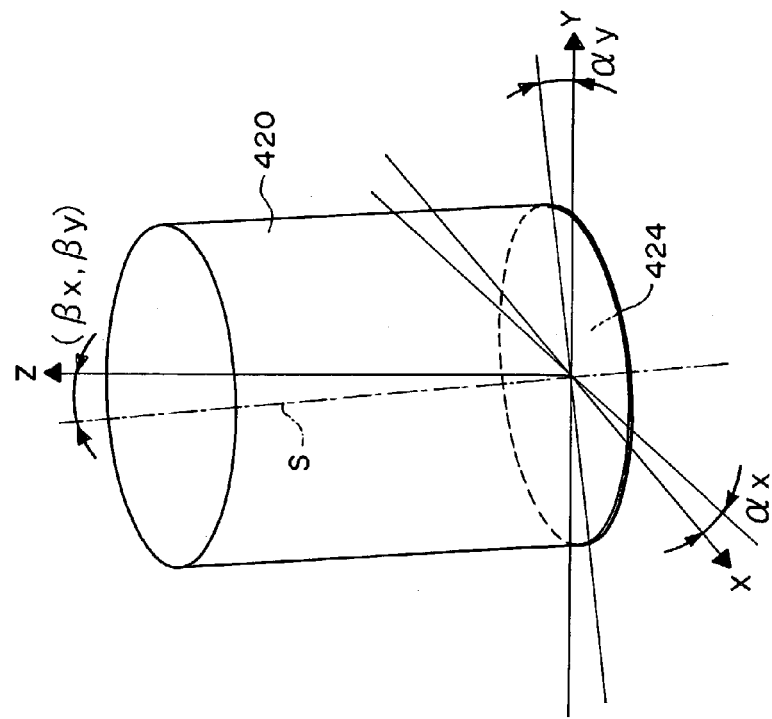
FIGS. 2A and 2B are schematic views for explaining an outline of a (two-dimensional) sample inclination measuring method.
Figure 2B:
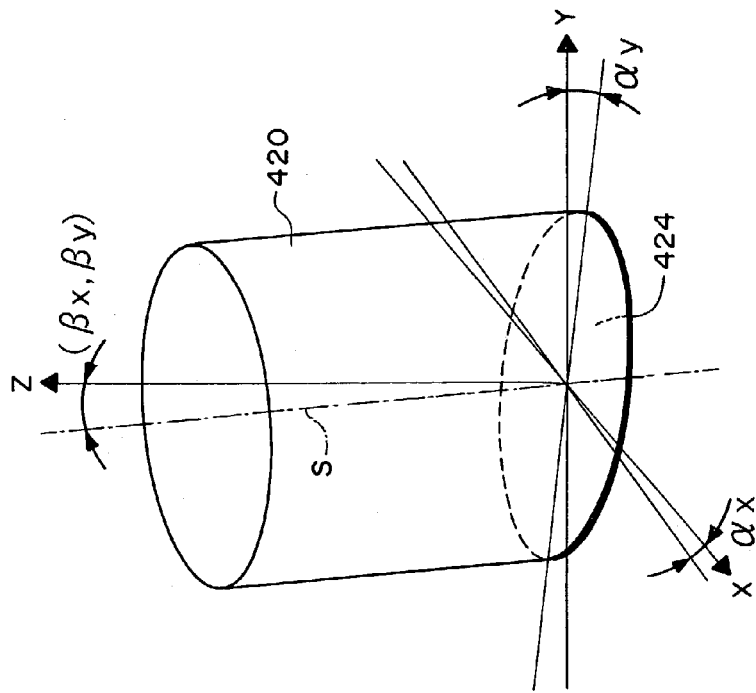

Though the method of measuring a one-dimensional inclination is explained in the foregoing, the sample inclination actually in demand is a two-dimensional one. The method of measuring a two-dimensional inclination is basically the same as that for the one-dimensional one mentioned above, and is specifically as follows:

FIGS. 2A and 2B are schematic views for explaining a sample inclination measuring method for determining two-dimensional inclinations (x- and y-directional inclinations).

In a state where the ferrule 420 is held by the clamping apparatus 300, relative angles ($m_{x1}$, $m_{y1}$) and ($m_{x2}$, $m_{y2}$) between the leading end face 424 of the ferrule 420 and the reference surface of the microscopic interferometer apparatus 1 are measured at a first rotational position (FIG. 2A) of the ferrule 420 and a second rotational position (FIG. 2B) rotated from the first rotational position by 180°, respectively.

Here, assuming that the leading end face 424 of the ferrule 420 is inclined by angles ($\alpha_x$, $\alpha_y$) with respect to a perpendicular to the axis S of the ferrule 420, and by angles ($\beta_x$, $\beta_y$) with respect to the optical axis of the microscopic interferometer apparatus 1 (a perpendicular to the reference surface of the microscopic interferometer apparatus 1, i.e., Z axis), the angles ($\beta_x$, $\beta_y$) can be determined by using so-called method of inversion as in the case of one-dimensional measurement as follows:

First, since $$\begin{cases} m_{x1} = \alpha_x + \beta_x \\ m_{y1} = \alpha_y + \beta_y \end{cases}, \text{ and} \quad (8)$$

$$\begin{cases} m_{x2} = 180 - \alpha_x + \beta_x \\ m_{y2} = 180 - \alpha_y + \beta_y \end{cases}, \quad (9)$$

$$\begin{cases} \beta_x = \dfrac{m_{x1} + m_{x2} - 180}{2} \\ \beta_y = \dfrac{m_{y1} + m_{y2} - 180}{2} \end{cases}. \quad (10)$$

In the ferrule of type specified such that the inclination of the leading end face 424 coincides with the perpendicular to the axis S of the ferrule 420, the efficiency of measurement can be improved if the inclination of the axis S of the ferrule 420 (concentricity) and the angles ($\alpha_x$, $\alpha_y$) of the leading end face with respect to the perpendicular to the axis S of the ferrule 420 (perpendicularity) can be measured at the same time as explained in the case of one-dimensional measurement.

In such a case, the angles ($\alpha_x$, $\alpha_y$) can be determined together with the angles ($\beta_x$, $\beta_y$) by yielding the following set of expressions (11):

$$\begin{cases} \alpha_x = \dfrac{180 - m_{x1} + m_{x2}}{2} \\ \alpha_y = \dfrac{180 - m_{y1} + m_{y2}}{2} \end{cases} \quad (11)$$

together with the above-mentioned set of expressions (10) from the above-mentioned sets of expressions (8) and (9).

Though the above-mentioned embodiment uses the relative angles ($m_{x1}$, $m_{y1}$) and ($m_{x2}$, $m_{y2}$) between the leading end face 424 of the ferrule 420 and the reference surface of the microscopic interferometer apparatus 1 detected at two positions separated from each other by 180°, the two relative rotational angles in the sample inclination measuring method in accordance with the present invention can take any values.

General expressions in this case are represented by the following set of expressions (12):

$$\theta_{xz} = \theta_x - \tan^{-1}(\tan\theta \cdot \sin\phi)$$

$$\theta_{yz} = \theta_y - \tan^{-1}(\tan\theta \cdot \cos\phi) \quad (12)$$

where $\theta_{xz}$ is the x-directional inclination of the axis S of the ferrule 420;

$\theta_{yz}$ is the y-directional inclination of the axis S of the ferrule 420;

$\theta_x$ is the x-directional inclination of the leading end face 424;

$\theta_y$ is the y-directional inclination of the leading end face 424;

$\theta$ is the inclination (maximum inclination angle) of the leading end face 424; and $\phi$ is the displacement angle from X axis of the projected line on the x-y plane of the maximum inclination line of the leading end face 424.

The above-mentioned $\phi$ is determined from the following expression (13):

$$A\left[\left(1-\frac{\phi^2}{2}\right)(1-\cos\Phi)+\left(\phi-\frac{\phi^2}{6}\right)\sin\Phi\right]=$$
$$\phi-\frac{\phi^2}{6}-\left(\phi-\frac{\phi^2}{6}\right)\cos\Phi-\left(1-\frac{\phi^2}{2}\right)\sin$$
$$\Phi\left[-\frac{A}{2}(1-\cos\Phi)-\frac{\sin\Phi}{6}+\frac{1}{6}-\frac{\cos\Phi}{6}-\frac{\sin\Phi}{2}\right]\phi^2+$$
$$(A\sin\Phi-1+\cos\Phi)\phi+A(1-\cos\Phi)\phi+\sin\Phi=0$$

where $$A=\frac{\theta_x-\theta'_x}{\theta_y-\theta'_y};$$

$\Phi$ is the x-directional inclination of the leading end face 424 when the rotational angle is $\Phi$; and $\theta'_y$ is the y-directional inclination of the leading end face 424 when the rotational angle is $\Phi$.

The above-mentioned $\theta$ is determined by the following expression (14):

$$\theta_Y-\theta_Y=\tan\theta[\cos\phi-\cos(\phi+\Phi)]. \quad (14)$$

Detection of Angle between Ferrule Leading End Face and Reference Surface

For carrying out the method of the above-mentioned embodiment, it is necessary to detect a relative angle between the leading end face 424 of the ferrule 420 and the reference surface of the microscopic interferometer apparatus 1. Various techniques can be used for detecting this relative angle. For example, since interference fringe information of the sample can be obtained by the microscopic interferometer apparatus 1, this can be utilized for yielding an interference fringe image of the sample. Then, the interference fringe image can be analyzed, so as to detect a two-dimensional relative angle between the leading end face 424 of the ferrule 420. As the fringe image analyzing technique, any of a technique utilizing a phase shift fringe analysis and a technique utilizing a Fourier transform fringe analysis can be employed.

Also, instead of analyzing interference fringe images, an angle detector such as autocollimator may be used for detecting the two-dimensional relative angles as a matter of course.

The gist of the present invention lies in measuring the inclination of the axis of the ferrule 420 with respect to the optical axis of the microscopic interferometer apparatus 1, and the inclination of the leading end face 424 of the ferrule 420 with respect to the perpendicular to the axis of the ferrule 420. Therefore, all the techniques for detecting the relative angle between the leading end face 424 of the ferrule 420 and the reference surface of the microscopic interferometer apparatus 1 will not be explained in detail. As a typical example thereof, a technique for detecting the relative angle between the leading end face 424 of the ferrule 420 and the reference surface of the microscopic interferometer apparatus 1 by utilizing the above-mentioned Fourier transform fringe analysis will be explained alone in detail in the following.

FIG. 3 is a flowchart schematically showing a technique for detecting the relative angle between the leading end face 424 of the ferrule 420 and the reference surface of the microscopic interferometer apparatus 1.

First, an interference fringe image, superposed with spatial carrier fringes, carrying form information of the sample is obtained by a CCD image pickup camera (S11). Subsequently, thus obtained interference fringe image data is subjected to Fourier transform (S12), a spatial carrier frequency ($f_x$, $f_y$) is extracted by filtering (S13), and a Fourier transform fringe analysis is carried out according to this carrier frequency, so as to yield c(x, y) which will be explained later, whereby the amount of inclination (relative angle) between the leading end face 424 of the ferrule 420 and the reference surface of the microscopic interferometer apparatus 1 is determined (S14).

A schematic system for measuring the amount of inclination between the leading end face 424 of the ferrule 420 and the reference surface of the microscopic interferometer apparatus 1 will now be explained with reference to FIG. 6.

Figure 6:
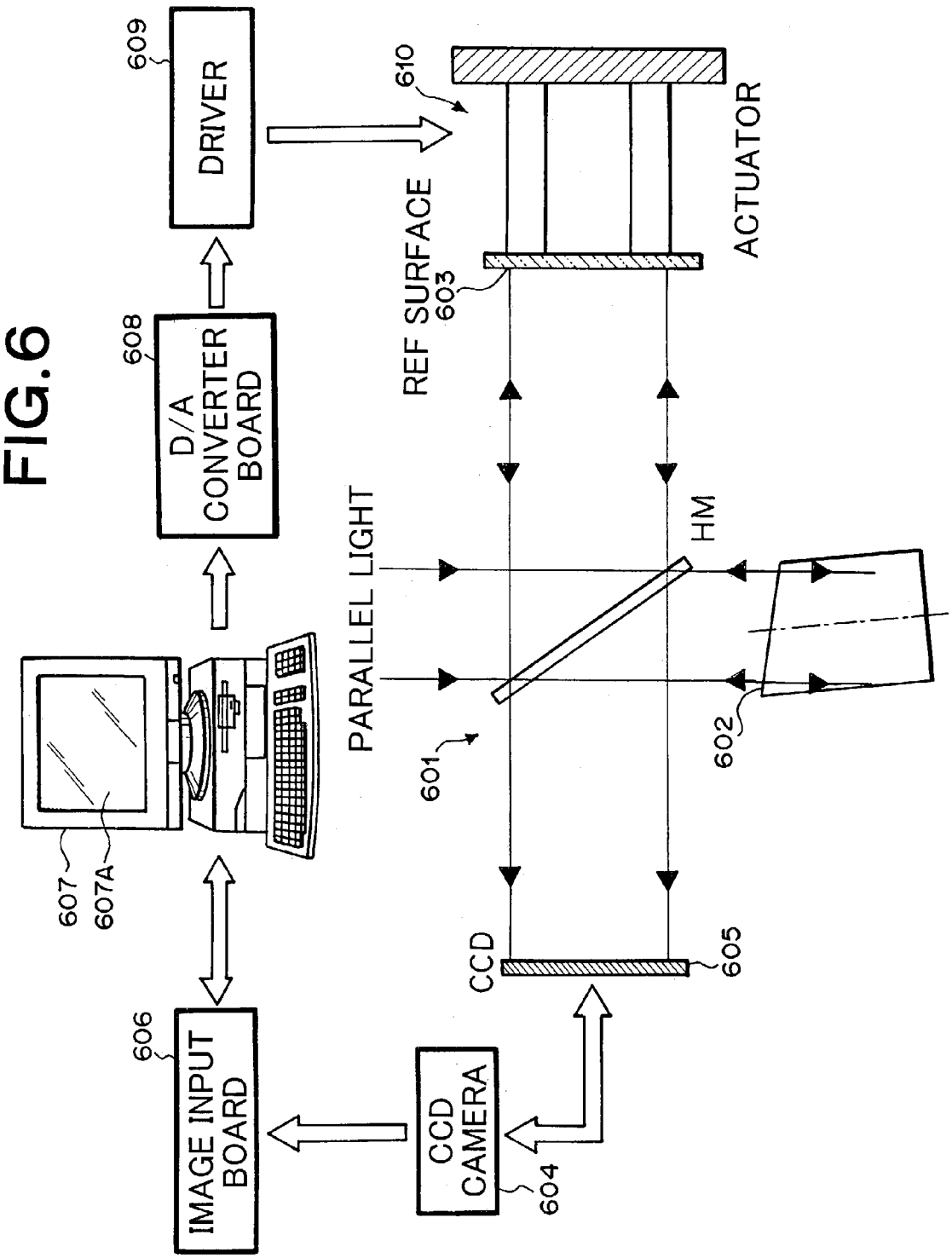
FIG. 6 is a block diagram showing an example of a system for detecting the angle between a ferrule leading end face and a reference surface.

As shown in FIG. 6, interference fringes formed by respective reflected luminous fluxes from a leading end face 602 (424) of a sample and a reference surface 603 in a Michelson type interferometer 601 are captured at an imaging surface of a CCD 605 of an image pickup camera 604, and are fed into a computer 607 equipped with a CPU and an image processing memory by way of an image input board 606. Thus fed interference fringe image data is subjected to various arithmetic operations, and the results of operations are displayed on a monitor screen 607A. Here, the interference fringe image data outputted from the image pickup camera 604 is temporarily stored into the memory upon an operation of the CPU.

The computer 607 is configured in terms of software such as to subject the obtained interference fringe image data to Fourier transform, calculate the amount of inclination between the leading end face 602 of the ferrule 420 and the reference surface 603 of the microscopic interferometer apparatus 1 according to the interference fringe image, and calculate the inclination of the axis of the ferrule 420 according to the amount of inclination between the leading end face 602 of the ferrule 420 and the reference surface 603 of the microscopic interferometer apparatus 1 as shown in FIG. 3.

As shown in FIG. 6, an actuator 610 is adapted to adjust the inclination of the reference surface 603 when the computer 607 sends a predetermined instruction to a driver 609 by way of a D/A converter board 608.

The above-mentioned detecting technique will now be explained with reference to expressions.

As mentioned above, a Fourier transform fringe analysis can determine a phase from a single fringe image sheet alone by introducing a carrier frequency (relative inclination between the sample leading end face 424 and the reference surface). When the carrier frequency is introduced, the interference fringe intensity is represented by the following expression (15):

$$i(x,y)=a(x,y)+b(x,y)\cos(2\pi f_x x+2\pi f_y y+\phi(x,y)+\xi) \quad (15)$$

where
 a(x, y) is the background of interference fringes;
 b(x, y) is the visibility of fringes;
 φ(x, y) is the phase of the sample;
 ξ is the phase shift amount (2πx/λ); and
 $f_x$ and $f_y$ are carrier frequencies.

The carrier frequencies $f_x$, $f_y$ are represented by the following set of expressions (15a):

$$f_x = \frac{2 \cdot \tan\theta_x}{\lambda}, f_y = \frac{2 \cdot \tan\theta_y}{\lambda}. \quad (15a)$$

Letting λ be the wavelength of light, $\theta_x$ and $\theta_y$ be x- and y-directional inclinations (postures) of the sample leading end face 424, and x be the phase shift amount of the phase shift device, the above-mentioned expression (15) can be deformed into the following expression (16):

$$i(x, y)=a(x, y)+c(x, y)\exp[i(2\pi f_x+2\pi f_y)]+c^*(x, y)\exp[i(2\pi f_x+2\pi f_y)] \quad (16)$$

where c*(x, y) is a conjugate of c (x, y):

$$c(x, y) = \frac{b(x, y)\exp\{i[\phi(x, y) + \xi]\}}{2}. \quad (17)$$

The above-mentioned expression (17) can be Fourier-transformed into the following expression (18):

$$I(\eta,\zeta)=A(\eta,\zeta)+C(\eta-f_x,\zeta-f_y)+C^*(\eta-f_x,\zeta-f_y) \quad (18)$$

where
 A(η, ζ) is a Fourier transform of a(x, y);
 C(η–$f_x$, ζ–$f_y$) is a Fourier transform of c(x, y); and
 C*(η–$f_x$, ζ–$f_y$) is a Fourier transform of c*(x, y).

In general, in Fourier transform, C(η–$f_x$, ζ–$f_y$) is determined by filtering, and a spectrum peak located at a position ($f_x$, $f_y$) on a frequency coordinate system is moved to the coordinate origin as shown in FIG. 4, so as to eliminate carrier frequencies. Subsequently, inverse Fourier transform is used for determining c(x, y), whereby a wrapped phase is obtained. Then, the phase Φ(x, y) of the sample is determined by unwrapping. Taking account of the fact that a predetermined angular relationship (relative posture), which is specifically the relationship of expression (15a), exists between the sample leading end face 424 and the reference surface, individual values of ($f_x$, $f_y$), which are carrier frequencies, are determined, and the relative angle between the sample leading end face 424 and the reference surface is determined according to these values.

When a sub-peak position other than the maximum peak located at the coordinate origin, i.e., the position of C(θ–$f_x$, ζ–$f_y$), is obtained from the result of the above-mentioned expression (18), the individual values of ($f_x$, $f_y$) are obtained. As a consequence, $m_x$ and $m_y$, which are x- and y-directional inclinations of the sample leading end face 424, can be determined.

Not only the above-mentioned technique (first technique), but also the following technique (second technique) can determine $m_x$ and $m_y$ which are the x- and y-directional inclinations of the sample leading end face 424.

The flowchart of FIG. 5 shows an outline of this inclination detecting method.

First, an interference fringe image, superposed with spatial carrier fringes, carrying form information of a sample is obtained by a CCD image pickup camera (S21). Subsequently, thus obtained interference fringe image data is subjected to Fourier transform (S22), and C(η–$f_x$, ζ–$f_y$), which is a spectrum distribution (side lobe) of carrier frequency, is extracted by filtering (S23). Then, this distribution C(η–$f_x$, ζ–$f_y$) is subjected to inverse Fourier transform, so as to obtain c(x, y), thus yielding a wrapped phase (S24). Thereafter, unwrapping is carried out, so as to determine the phase p(x, y) of the sample according to the form information of the sample leading end face 424 (S25). Then, a least-square plane of the phase p(x, y) is determined by use of least-square method (S26). Finally, the inclination of the sample leading end face 424 is determined according to differential coefficients of the least-square plane (S27).

In the Fourier fringe analysis method in the above-mentioned first technique, C(η–$f_x$, ζ–$f_y$), which is a spectrum distribution (side lobe) of carrier frequency on a frequency coordinate system, is extracted, a peak thereof is then moved from its position ($f_x$, $f_y$) to the origin of coordinates so as to eliminate the carrier frequency, and inverse Fourier transform is carried out thereafter so as to determine the phase (form) of the sample leading end face 424.

In the second technique, by contrast, the inclination of the sample leading end face 424 is considered to be a part of the form thereof, and the peak of C(η–$f_x$, ζ–$f_y$), which is a spectrum distribution (side lobe) of carrier frequency in the above-mentioned expression (18), is subjected to inverse Fourier transform without moving, i.e., without eliminating the carrier frequency. As a result, the finally obtained phase p(x, y) of the sample leading end face 424 includes an inclination component.

Namely, the above-mentioned phase p(x, y) is represented as in the following expression (19):

$$\begin{aligned} p(x, y) &= 2\pi f_x + 2\pi f_y + \phi(x, y) \\ &= ax + by + \phi(x, y) \\ &= \tan(\theta_x)x + \tan(\theta_y)y + \phi(x, y) \end{aligned} \quad (19)$$

where
 a is the differential coefficient of the least-square plane in x direction; and
 b is the differential coefficient of the least-square plane in y direction.

Thus, the second technique uses least-square method so as to determine a least-square plane of the form of the sample leading end face 424 determined without eliminating the carrier frequency (i.e., a plane obtained by fitting the form by least-square method), defines differential coefficients in x and y directions of the least-square plane, and obtains the inclinations $m_x$ and $m_y$ of the sample leading end face 424 by using the above-mentioned expression (19), thereby being able to determine the inclination of the sample leading end face 424 with respect to the reference surface easily.

In the above-mentioned technique, fitting techniques other than the least-square method may be employed when determining a plane representative of the form of the sample leading end face 424. For example, fitting may be effected with a predetermined spherical surface, and the inclination of a tangent plane at the center coordinate point of the spherical surface may be determined, so as to estimate the inclination of the sample leading end face 424 with respect to the reference surface.

Thus, the two-dimensional inclination of the sample leading end face 424 with respect to the reference surface can be detected by using a Fourier transform fringe analysis. When determining the two-dimensional inclination of the sample leading end face 424 with respect to the reference surface by the Fourier transform fringe analysis, it is not necessary for the whole area of the fringe image to be used. Analyzing a part of fringe image area can yield sufficiently effective data as well.

Sample Inclination Correction

Since the relative angle ($\beta_x$, $\beta_y$) of the axis S of the ferrule 420 with respect to the optical axis of the microscopic interferometer apparatus 1 can be measured as mentioned above, the inclination of the axis S of the ferrule 420 can be corrected thereafter according to thus measured value.

In this case, displaying the relative angle ($\beta_x$, $\beta_y$) of the axis S of the ferrule 420 with respect to the optical axis of the microscopic interferometer apparatus 1 is preferable in that it becomes easier to correct the inclination.

The correction of inclination may be carried out by a manual adjustment, or by automatic adjustment according to an output value corresponding to the relative angle ($\beta_x$, $\beta_y$).

Further, the measured data may be corrected while using a value corresponding to the relative angle ($\beta_x$, $\beta_y$) as a correction value, so as to correct the inclination.

Etc.

Without being restricted to the above-mentioned embodiments, the sample inclination measuring method in accordance with the present invention can be modified in various manners. For example, though the above-mentioned embodiments detect relative angles between the leading end face 424 of the ferrule 420 and the reference surface of the microscopic interferometer apparatus 1 at two positions rotated from each other by 180°, the relative rotational angles may take any values in the sample inclination measuring method of the present invention. In this case, the angle may be detected by using a rotational angle sensor such as gyro, for example.

As explained in detail, the first sample inclination measuring method of the present invention rotates, by a predetermined angle with respect to an interferometer apparatus, a columnar member having a leading end face in a planar form while the columnar member is held by a clamping apparatus, detects a relative angle between a reference surface of the interferometer apparatus and the leading end face at each of two rotational positions, and measures the inclination of the axis of the columnar member by using a predetermined arithmetic expression according to thus detected two angles.

Since the inclination of the axis of the columnar member can be measured by simply detecting the relative angle between the reference surface of the interferometer apparatus and the leading end face at each of two rotational positions of the columnar member with respect to the interferometer apparatus and carrying out an arithmetic operation while inputting thus measured values into a predetermined arithmetic expression, the measurement of inclination of the axis, which is essential when adjusting the inclination of the axis, can be carried out easily at a low cost with a high accuracy.

The second sample inclination measuring method of the present invention rotates, by a predetermined angle with respect to an interferometer apparatus, a columnar member having a leading end face in a planar form while the columnar member is held by a clamping apparatus, detects a relative angle between a reference surface of the interferometer apparatus and the leading end face at each of two rotational positions, and measures the inclination of the axis of the columnar member and the inclination of the leading end face with respect to a perpendicular to the axis of the columnar member by using a predetermined arithmetic expression according to thus detected two angles.

Thus, the second sample inclination measuring method measures the inclination of the axis of the columnar member and the inclination of the leading end face with respect to the perpendicular to the axis of the columnar member at the same time, thereby enabling highly efficient measurement in addition to the effects obtained by the first sample inclination measuring method.

The columnar member used in the sample inclination measuring methods in accordance with the invention is not limited to a cylindrical member whose sectional plan view is circle.

What is claimed is:

1. A sample inclination measuring method for measuring an inclination of an axis of a columnar member having a leading end face in a planar form while said columnar member is held by a clamping apparatus and said leading end face as a sample is observed by an interferometer apparatus;

said method comprising the steps of:

rotating said columnar member by a predetermined angle with respect to said interferometer apparatus while in a state held by said clamping apparatus, and detecting a relative angle between a reference surface of said interferometer apparatus and said leading end face at each of two rotational positions; and measuring said inclination of said axis of said columnar member by using a predetermined arithmetic expression according to said detected two angles;

wherein said relative angle between said reference surface of said interferometer apparatus and said leading end face is detected at each of first and second rotational angles separated from each other by said predetermined angle of 180°; and said inclination of said axis of said columnar member is measured by using the following set of conditional expressions:

$$\begin{cases} \beta_x = \dfrac{m_{x1} + m_{x2} - 180}{2} \\ \beta_y = \dfrac{m_{y1} + m_{y2} - 180}{2} \end{cases}$$

where $m_{x1}$ and $m_{y1}$ are x- and y-directional angles detected at said first rotational position, respectively; $m_{x2}$ and $m_{y2}$ are x- and y-directional angles detected at said second rotational position, respectively; and $\beta_x$ and $\beta_y$ are angles of inclinations of said axis of rotation in x and y directions, respectively; and a manual or an automatic step of adjusting the physical inclination of the axis.

2. A sample inclination measuring method according to claim 1, wherein said angles at said two rotational positions are detected by a phase shift fringe analysis.

3. A sample inclination measuring method according to claim 1, wherein said angles at said two rotational positions are detected by a Fourier transform shift fringe analysis.

4. A sample inclination measuring method according to claim 1, wherein said columnar member is a ferrule.

5. A sample inclination measuring method according to claim 1, wherein said interferometer apparatus is a microscopic interferometer apparatus.

6. A sample inclination measuring method for measuring an inclination of an axis of a columnar member having a leading end face in a planar form while said columnar member is held by a clamping apparatus and said leading end face as a sample is observed by an interferometer apparatus, and an angle of said leading end face with respect to a perpendicular to said axis of said columnar member;

said method comprising the steps of:

rotating said columnar member by a predetermined angle with respect to said interferometer apparatus while in a state held by said clamping apparatus, and detecting a relative angle between a reference surface of said interferometer apparatus and said leading end face at each of two rotational positions; and measuring said inclination of said axis of said columnar member and an inclination of said leading end face with respect to said perpendicular of said axis of said columnar member by using a predetermined arithmetic expression according to said detected two angles;

wherein said relative angle between said reference surface of said interferometer apparatus and said leading end face is detected at each of first and second rotational angles separated from each other by said predetermined angle of 180°; and said inclination of said axis of said columnar member and said inclination of said leading end face with respect to said perpendicular to said axis of said columnar member are measured by using the following sets of conditional expressions:

$$\begin{cases} \alpha_x = \dfrac{180 - m_{x1} + m_{x2}}{2} \\ \alpha_y = \dfrac{180 - m_{y1} + m_{y2}}{2} \end{cases}$$

$$\begin{cases} \beta_x = \dfrac{m_{x1} + m_{x2} - 180}{2} \\ \beta_y = \dfrac{m_{y1} + m_{y2} - 180}{2} \end{cases}$$

where $m_{x1}$ and $m_{y1}$ are x- and y-directional angles detected at the first rotational position, respectively; $m_{x2}$ and $m_{y2}$ are x- and y-directional angles detected at the second rotational position, respectively; $\beta_x$ and $\beta_y$ are angles of inclinations of the axis of rotation in x and y directions, respectively; and $\alpha_x$ and $\alpha_y$ are angles of inclinations of the leading end face with respect to the perpendicular to the axis of the columnar member, respectively; and a manual or an automatic step of adjusting the physical inclination of the axis.

7. A sample inclination measuring method according to claim 6, wherein said angles at said two rotational positions are detected by a phase shift fringe analysis.

8. A sample inclination measuring method according to claim 6, wherein said angles at said two rotational positions are detected by a Fourier transform fringe analysis.

9. A sample inclination measuring method according to claim 6, wherein said columnar member is a ferrule.

10. A sample inclination measuring method according to claim 6, wherein said interferometer apparatus is a microscopic interferometer apparatus.

* * * * *

UNITED STATES PATENT AND TRADEMARK OFFICE
CERTIFICATE OF CORRECTION

PATENT NO. : 7,245,384 B2
APPLICATION NO. : 10/465623
DATED : July 17, 2007
INVENTOR(S) : Zongtao Ge, Fumio Kobayashi and Kunihiko Tanaka It is certified that error appears in the above-identified patent and that said Letters Patent is hereby corrected as shown below:

<u>Column 18</u>

Line 1, delete the expression: "
$$\begin{cases} \alpha_x = \dfrac{180 - m_{x1} + m_{x2}}{2} \\ \alpha_y = \dfrac{180 - m_{y1} + m_{y2}}{2} \end{cases}$$
"

$$\begin{cases} \beta_x = \dfrac{m_{x1} + m_{x2} - 180}{2} \\ \beta_y = \dfrac{m_{y1} + m_{y2} - 180}{2} \end{cases}$$

and substitute therefore --
$$\begin{cases} \alpha_x = \dfrac{180 + m_{x1} - m_{x2}}{2} \\ \alpha_y = \dfrac{180 + m_{y1} - m_{y2}}{2} \end{cases}$$
--

$$\begin{cases} \beta_x = \dfrac{m_{x1} + m_{x2} - 180}{2} \\ \beta_y = \dfrac{m_{y1} + m_{y2} - 180}{2} \end{cases}$$

Signed and Sealed this

Twentieth Day of November, 2007

JON W. DUDAS
*Director of the United States Patent and Trademark Office*